United States Patent Office 3,183,194
Patented May 11, 1965

3,183,194
METHOD OF PREPARING SPHERICAL ACTIVE ALUMINA GEL AND SPHERICAL ACTIVE ALUMINA-SILICA GEL
Tsutomu Kuwata, Tokyo, Yujiro Sugawara, Tsuroka-shi, Yamagata-ken, and Tadahisa Nakazawa, Oebata, Nakajo-machi, Kitakanbara-gun, Niigata-ken, Japan, assignors to Mizusawa Kagaku Kogyo Kabushiki Kaisha, Osaka, Japan, a corporation of Japan
No Drawing. Filed Apr. 17, 1961, Ser. No. 103,207
Claims priority, application Japan, Mar. 31, 1961, 36/10,720
13 Claims. (Cl. 252—317)

This invention relates to the method of preparing spherical active alumina gel and spherical active alumina-silica gel, which are without cracks. More particularly, the invention relates to the method of preparing spherical compositions without cracks which comprise 100% of alumina or of $Al_2O_3$ in which $SiO_2/(Al_2O_3+SiO_2)$ is less than 55% on a weight basis.

It is an object of the invention to provide an industrial method of preparing alumina type and/or alumina-silica type spherical active gels whose shock resistance and attrition resistance are great and which possess various exceedingly superior properties as industrial desiccants, catalysts and catalyst carriers.

Another object of the invention is to provide a novel neutralization process for alumina type and/or alumina-silica type hydrogels.

Other objects and advantages of the invention will become apparent from a consideration of the following description thereof.

The objects and advantages of the present invention are achieved by performing as follows. First, a stock solution selected from the group consisting of an aqueous colloidal solution of a basic aluminium sulfate whose composition is $Al_2O_3$ 1.6–0.8 $SO_2$ and a mixed solution of an aqueous colloidal solution of a basic aluminum sulfate whose composition is $Al_2O_3$ 1.6–0.8 $SO_3$ and silica sol of pH 1–3, in which $SiO_2/(Al_2O_3+SiO_2)$ is less than 55% on a weight basis, is passed through a solvent that is immiscible with water whose temperature is 40–100° C. to render the solutions into homogeneous spherical hydrogels. Then before these hydrogels manifest softening phenomenon they are transferred into water and washed therein thereby obtaining spherical hydrogels whose $SO_3Al_2O_3$ on a molar basis is 0.4–0.7. This is followed by the conversion of a greater part of the sulfate radicals that remain in the hydrogels to sulfate salts without directly contacting these spherical hydrogels with an alkaline solution. Then the hydrogels are contacted with an alkaline solution of pH 7 or above thereby forming spherical hydrogels selected from the group consisting of aluminum hydroxide and hydrated alumina-silica, following which they are dried.

Next, the invention will be described in further detail.

As starting materials the present invention employs either an aqueous colloidal solution of basic aluminum sulfate (hereinafter to be referred as stock solution 1) or a mixed solution of an aqueous colloidal solution of basic aluminum sulfate and silica sol (hereinafter to be referred to as stock solution 2).

The aqueous colloidal solution of basic aluminum sulfate (stock solution 1) is obtained industrially by adding powdered calcium carbonate gradually to an aqueous solution of concentrated aluminum sulfate with vigorous stirring and then while maintaining only the alumina portion in a soluble state precipitating as gypsum the sulfate ions to obtain the aforesaid aqueous colloidal solution of basic aluminum sulfate as a supernatant liquid. When shown as a chemical equation, it is as follows:

$Al_2O_3 \cdot 3SO_3 + CaCO_3 \rightarrow Al_2O_3 \cdot 1.6-0.8 \ SO_3$
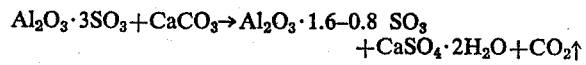
$+CaSO_4 \cdot 2H_2O + CO_2\uparrow$ If the concentration of the aqueous solution of aluminum sulfate is too dilute, the objective cannot be achieved, because the $Al_2O_3$ portion also precipitates before the $SO_3Al_2O_3$ on a molar basis becomes sufficiently small. It is preferable that the concentration of aluminum sulfate in terms of $Al_2O_3$ be above 6 g./100 cc., that which at room temperature is at or near the saturation point being particularly suitable.

Moreover, even if there are present in the stock aluminum sulfate sulfates that are soluble in water and whose pH values are close to neutral such as Na′, K′, Mg″, Zn″, Fe‴, $NH_4'$, etc., it will do no harm in preparing the stock basic aluminum sulfate sol.

The $SO_3/Al_2O_3$ (mol) of the stock basic aluminum sulfate sol becomes a very important factor in the preparation of spherical gel. If the $SO_3/Al_2O_3$ on a molar basis is larger than 1.62, since the unique phenomenon of hydrogelling is not manifested upon heating or even if manifested, the hydrogels are too soft, perfect spherical gels cannot be made.

In view of the above reason, while it is desirable that the $SO_3/Al_2O_3$ (mol) be made small, if one should try to lower it to below 0.8, there is the possibility of precipitating the $Al_2O_3$ portion.

Therefore, the proper range of the $SO_3/Al_2O_3$ on a molar basis should be from 1.6 to 0.8. While the basic aluminum sulfate sol is usually prepared by reacting an aqueous solution of aluminum sulfate with calcium carbonate, it is also possible to prepare the stock sol by adding a small amount of magnesium carbonate, sodium bicarbonate, ammonium carbonate, etc. and adjusting the $SO_3/Al_2O_3$ of those aqueous solutions of basic aluminum sulfate whose $SO_3/Al_2O_3$ are comparatively great, namely, that prepared by reacting an aqueous solution of aluminum sulfate with a comparatively small amount of calcium carbonate or that prepared by reacting sulfuric acid with metallic aluminum or aluminum hydroxide for a long number of hours.

As to the stock solution 2, it is obtained by mixing the aforesaid stock solution 1 with the below-described silica sol so that the $SiO_2/(Al_2O_3+SiO_2)$ on a weight basis becomes 0–55%. The silica sol is obtained by the usual method of adding sodium silicate gradually to an acid with stirring.

The mixing proportion of the basic aluminum sulfate sol and silica sol on a weight basis of the $SiO_2/(Al_2O_3+SiO_2)$ may be selected at an optional point within the range of 0 to 55%. Since there is a greater loss of the $Al_2O_3$ portion as compared with the $SiO_2$ during the preparation process, the $SiO_2/(Al_2O_3+SiO_2)$ of the product has a tendency to become greater than the $SiO_2/(Al_2O_3+SiO_2)$ of the starting material. When the $SiO_2/(Al_2O_3+SiO_2)$ becomes great, a tendency is manifested in which either the specific surface area and the moisture adsorption capacity of the product increase or its heat resistance and moisture adsorption intensity decrease.

Hence, in using the stock solution 2 the most suitable $$SiO_2/(Al_2O_3+SiO_2)$$

must be selected depending on the end to be achieved.

In accordance with the present invention the stock solution 1 or 2 is made to pass through a heated solvent that is immiscible with water. Thereupon the stock solution owing to its own surface tension becomes spherical which when heated at 40–100° C. is converted in from several seconds to several minutes into hydrogels without undergoing any change in shape.

The size of the hydrogels, that is, the size of the balls of the product, are determined by the relationship of such as the size of the nozzle employed to eject the stock solution, the difference in specific gravities between the stock solution and the solvent, the viscosity of the stock solution, and the surface tension, and it is possible to freely regulate the sizes of the product as to obtain hydrogels of diameters from 20–30 mm. to those which are less than 1 mm. in diameter.

As methods of passing the stock solution through the solvent, there is either the method in which the stock solution is dripped or sprayed on top of a solvent having a lighter specific gravity than the stock solution and passed through to the bottom of said solvent or the method in which the stock solution is introduced under pressure into the bottom of a solvent having a heavier specific gravity and passed through to the top of said solvent.

The former is adapted to the production of comparatively small size spherical products, whereas the latter is adapted to the production of relatively large size spherical products. In particular, when large spherical products are to be prepared, it is preferable that the opening of the nozzle is in a state where it is immersed in the solvent. Otherwise pits would appear in the product as to become the cause of the lowering of the pressure resistance intensity. Since hydrogelling of the stock solution occurs upon heating, in case of long hours of operation it is absolutely necessary that the nozzle be maintained in a cool state. For cooling only the vicinity of the nozzle without affecting the other parts the method in which the nozzle is provided at the bottom, and the stock solution is made to pass from the bottom to the top is more advantageous.

Although as the solvent to be employed in the present invention any which is not miscible with water and moreover which does not react with the stock solution may be used, for use on an industrial scale it is preferable that it is one which possesses the following characteristics; namely, that it does not adhere to the hydrogels, that its viscosity is low so as to prevent its loss, and its boiling point high so as to minimize the loss in case of heating, and further, if possible, that it is nonpoisonous, low in cost and noncombustible. As solvents that have a lighter specific gravity than the stock solvent there can be mentioned the petroleum hydrocarbons such as, for example, kerosene, gas oil, spindle oil, etc. As those solvents of heavier specific gravity the di- or trichlorobenzene singly or a mixed solvent of these and the petroleum hydrocarbons are suitable. Carbon tetrachloride is undesirable on account of not only its toxicity but also its low boiling point.

Care must be exercised in the present invention when heating the stock solution to accomplish conversion to hydrogels to ensure that the gases (air, carbon dioxide, hydrogen gas, etc.) dissolved in the stock solution are first removed completely, because when the stock solution is heated and hydrogelling takes place, if gases were to be present, with a sudden increase in the volume strains would occur in the insides of the hydrogels as to result inevitably in the occurrence of cracks. However, when this end has been achieved naturally as a result of having performed deairing operations to clarify the stock solution by means of vacuum filtering, the above operation may naturally be omitted. The heating time of the hydrogels must be controlled strictly for the following reasons. If the hydrogels are transferred into water before hydrogelling has completely reached the inside of the balls, on account of insufficient heating, perfect spherical products cannot be obtained even if the subsequent operations are performed properly, and there would be a marked increase in the productions of spherical products that are damaged or that have cracks therein. On the other hand, if the heating time is too long, the hydrogels will become soft again and finally result in a loss of their shape. These also cannot become perfect spherical products. In case of the hydrogels whose diameters are comparatively small, the hydrogelling is completely accomplished by heating for a short period of time. When the diameters of the hydrogels are relatively large, for example, more than 5 mm., 10 to 15 minutes is the proper heating time. If either shorter than or longer than this, the yield of perfect spherical active gels without cracks will decrease.

Furthermore, in accordance with the present invention, in order to promote the homogeneous hydrogelling of the sol it is highly desirable that immediately prior to heating of the stock solution 10–30% thereof of water be added thereto. The addition of water immediately prior to heating is entirely different from the use of a dilute stock solution from the start. The greatest effectiveness is manifested when a large amount of water is added to as concentrated a sol as possible. The reasons are: First, it is impossible to maintain the $SO_3/Al_2O_3$ (mol) low with a dilute basic aluminum sulfate sol. Secondly, it is believed that the water immediately subsequent to its addition to the sol, which not having as yet hydrated the macromolecules of the aluminum and is free, manifests effective action with respect to hydrogelling.

While passing through the heated solvent, the stock solution which has become hydrogels from the sol completes its uniform hydrogelling, and before the softening phenomenon appears they are transferred into the water. By the successive addition of fresh water or hot water and washing out hydrolysis is effected, and a part of sulfate radicals contained is removed. Precisely, while the $SO_3/Al_2O_3$ (mol) of the stock basic aluminum sulfate sol is 1.6–0.8, by effecting hydrolysis of this with water the $SO_3/Al_2O_3$ (mol) is lowered to about 0.4–0.7. This is shown by the following equation:

$$Al_2O_3 \; (1.6-0.8) \; SO_3 + H_2O$$
$$\rightarrow Al_2O_3 \; (0.4-0.7) \; SO_3 + Al_2O_3 \; (2.5-3.0) \; SO_3$$

By the gradual removal of the $Al_2O_3$ (2.5–3.0) $SO_3$ that has become soluble the reaction proceeds from left to right, and the spherical hydrogel loses a part of the sulfate radicals and is stabilized so that even if left to stand it does not return to a sol, thus making possible the retention of its shape. In the case of stock solution 2, as it contains a silica sol, silica is co-precipitated with the alumina portion in the hydrogel. However the hydrolytic mechanism is substantially the same.

Furthermore, this rinsing process does not merely stabilize the hydrogels that have been rendered spherical, but it is also a step which is indispensable for obtaining the spherical active gel, which is the ultimate objective of the invention. No matter how skillful the subsequent operations are performed, the spherical products that do not pass through this step have too many cracks and thus cannot attain the object of the invention. This rinsing process inevitably results in the following secondary effect. That is, the salts that are contained as impurities are dissolved and present in the aqueous colloidal solution of the stock basic aluminum sulfate are removed during this step.

For example, even if a basic aluminum sulfate sol that has started with aluminum sulfate containing iron salts is used as the stock solution, if the iron salts therein have been reduced to the form of ferrous salts, they may be removed with no trouble. However, if the iron salts are present in the form of ferric salts, these being slightly acidic or neutral and having the property such that they precipitate, the initial object cannot be attained.

Thus, as described hereinabove, the presence in the stock solution of alkali salts, magnesium salts and other salts that are neutral or slightly acidic and are water-soluble will cause no harm whatsoever.

Moreover, in case a small amount of iron salts remaining in the hydrogel becomes a hindrance in the use of the product, by heat treating this hydrogel with an aqueous solution of sodium hydrosulfite as to render the small amount of iron salts soluble which is then removed, it is possible to prepare spherical active gels not containing iron.

In the present invention, after having made the $SO_3/Al_2O_3$ of the hydrogels 0.4–0.7 on a molar basis, it is necessary to gradually raise the pH and remove the remaining sulfate radicals as soluble sulfate.

When the sulfate radicals remain in the hydrogel, not only is it not possible for perfect spherical products to be formed, but also the activity (hygroscopic property, catalytic property, etc.) itself of the active gels scarcely develops.

We also found that if the pH was raised abruptly for the purpose of removing the sulfate radicals, cracks in the hydrogel would occur as to cause them to crumble or although their spherical appearance would be retained, owing to imperceptible cracks the pressure resistance intensity or attrition resistance would deteriorate as to render them unsuitable for the intended purpose.

While heretofore the steps of treating with ammonia water and ripening were known in preparing alumina gel or silica gel, the concept that it was necessary to attain the intended pH gradually over several hours or several tens of hours did not exist. Even in case of hydrogels that have been thoroughly washed with water and whose $SO_3/Al_2O_3$ has been made 0.4–0.7 on a molar basis, if subjected to the operation such as immersing directly in ammonia water, cracks would at that instant develop in the hydrogels, and the intended perfect spherical products cannot be obtained.

Thus, as described hereinabove, the method of removing the sulfate radicals has a important bearing on the yield of perfect spherical active gels, this moreover being the more serious the greater the diameter of the hydrogels become.

It is for the above reason that the following steps are followed in forming the spherical hydrogels of aluminum hydroxide or of aluminum hydroxide containing silica. The homogeneous spherical hydrogels that have been obtained by passing the stock solution through a solvent immiscible with water and of a temperature of 40–100° C. are washed with water to make them into spherical hydrogels whose $SO_3/Al_2O_3$ on a molar basis is 0.4–0.7. Then without allowing these spherical hydrogels to directly contact an alkaline solution the greater part of the sulfate radicals remaining in said hydrogels are converted to sulfate salts, following which the hydrogels are contacted with an aqueous alkaline solution whereby the aforesaid spherical hydrogels of aluminum hydroxide or of aluminum hydroxide containing silica are formed.

The foregoing condition can be achieved by doing as follows. First, the method of treating the hydrogels subsequent to their washing with water with a substance which can gradually and moreover uniformly effect neutralization without the evolution of an excessive amount of gas upon heating such as urea or hexamine. After having been thus treated, the sulfate radicals can be completely removed even if, for convenience sake, a means such as, for example, a treatment with ammonia water is used. Secondly, there is a method of packing the hydrogels in a tower after their washing with water, through which is allowed to flow from the top a buffer solution such as, for example, a 0.1 M solution of ammonium acetate until sulfate ions can no longer be detected. In this case, a buffer solution containing phosphate ions is not desirable since said phosphate ions would react with the alumina portion as to affect the quality of the product. Thirdly, there is a method of placing the hydrogels after washing with water in a tank having at its bottom a foraminous dish and while circulating water in the tank adding very gradually ammonia water. And fourthly, there is a method in which the hydrogels after washing with water is repeatedly treated with dilute ammonia water containing a large amount of ammonia salts.

The above-described methods 1 to 4 have been set forth merely to illustrate the desirable methods of neutralizing the hydrogels in the present invention. Needless to say, these methods may be combined. When the greater part of the sulfate radicals are converted to their salts by means of the aforementioned methods 1 to 4, subsequently even if the hydrogels are subjected to alkaline solutions of high pH value, since there is no need for any fears that cracks might develop, by treating with an optional alkali such as, for example, ammonia water of about 0.1–2% concentration and making the final pH above 7.0, particularly above 8.0, the sulfate radicals remaining in the hydrogels can be completely removed.

As to the alkali to be used, it is most preferable that ammonia water be used since it does not cause alkali metals and alkali earth metals to remain in the product gels. After completion of the ammonia treatment, washing is performed with water and as much as possible of the sulfate ions are washed away, following which the hydrogels are dried. When the drying is carried out too rapidly cracks develop in the hydrogels. Therefore, in the present invention, it is preferred that the drying be performed gradually particularly in the presence of saturated steam. After drying, if required, calcination is performed for improving the quality of the product, it being sufficient if the calcination is performed at 350–650° C. for 1–3 hours. An improvement of adsorption ability and hygroscopic ability as well as a very great improvement of the hardness and durability of the balls are brought about as a result of calcination.

Thus, hard, perfect spherical-shaped alumina or alumina-silica type active gels without cracks can be obtained with ease industrially. While heretofore as desiccating agents, catalysts and catalyst carriers the powdered alumina gel formed into pillets or balls have been used, with their pressure resistance intensity at the most being 5–35 kg. they would in most cases wear off and produce dust during their use. The dust produced would not only hinder the passage of gas but also were highly dangerous in that they would stop up valves and nozzles, for example. By means of the present invention, this is the first time that spherical active gels of the alumina or alumina-silica type whose hardness is great and without cracks have been obtained, and these that have been obtained manifest very excellent properties for dehumidifying the air when performing air separation, dehumidifying petroleum cracking gas, removal of oil mist present in various high pressure gases, dehydrating of various non-polar solutions such as xylene, toluene, transformer oil, etc., and as catalysts for various purposes or catalyst carrier, and moreover they can be utilized safely on a large scale.

EXAMPLE 1

To 1 liter of a saturated aqueous solution of aluminum sulfate ($Al_2O_3$ 11.80 g./100 cc. $SO_3$ 28.2 g./100 cc. $SO_3/Al_2O_3$(mol)=3, pH 1.4) 210 grams of powdered limestone that has been sifted to a 200-mesh screen size was added gradually over about a 10-hour period with violent stirring at room temperature, and an aqueous colloidal solution (sol) of basic aluminum sulfate having a composition such as below was obtained as a supernatant liquid. The composition of the sol was as follows:

| | |
|---|---|
| $Al_2O_3$ | 12.05 g./100 cc. |
| $SO_3$ | 12.30 g./100 cc. |
| $SO_3/Al_2O_3$ | Mol=1.30. |
| pH | 3.6. |

Before granulating this sol it was deaired for 3 hours in vacuo and the gas dissolved therein was removed. Furthermore, immediately prior to granulating, water was added to this sol and mixed with it at the rate of 150 cc. of water to 1 liter of sol. This liquid was dropped from the top of an 8-meter tower filled with spindle oil, this spindle oil being maintained at 85° C. by means of a heater. The sol became balls in the spindle oil, and by the time they reached the bottom of the tower while being heated became hydrogels whose diameters were 2–4 mm. The hydrogels at the bottom of the tower were then transported away by means of a pipe and were deposited in a separately provided tank filled with water. The hydrogels in the tank were subjected to an operation in which hot water was added and discarded, which operation was repeated 5–8 times. By this operation part of the 1.3 mols of sulfate radicals bonded to the hydrogels was washed away by hydrolysis, and the $SO_3/Al_2O_3$ on a molar basis dropped to about 0.63. After removing the water a urea solution of 1% concentration was added in a quantity sufficient to submerge the hydrogels followed by heating for 8 hours at 90° C. Then the pH of the hydrogels rose from 4.5 to 7.1. After the urea solution was drawn off, ammonia water of 2% concentration was added in a quanity sufficient to surmerge the hydrogels, which was then heated for 6 hours at 50° C. thereby converting the sulfate radicals remaining in the hydrogels to ammonium sulfate (the pH becomes 9.2), following which water was added and washing was carried out until detection of sulfate ions was no longer possible. Thereafter the hydrogels were dried for 24 hours in an almost perfectly sealed tank thermostatically maintained at 120° C., following which they were also calcined for 3 hours at 550° C. whereby was obtained spherical active alumina having a diameter of 1–2 mm. The yield of the active alumina based on basic aluminum sulfate, the raw material, was about 75%. The thus obtained spherical active alumina will be made sample No. 1.

EXAMPLE 2

From above a granulating tower in which the top layer consisted of a 50-cm. thick flotage of gas oil and whose lower part hot water at 85° C. the aqueous colloidal solution of basic aluminum sulfate of Example 1 was ejected from a nozzle at a pressure of 2.2 atmospheres to the surface of the gas oil. The stock solution which had become minute drops became minute hydrogels while passing through the heated layer of gas oil and immediately entered the water. These hydrogels whose diameters were 0.05–0.5 mm. were conducted by means of a pump to another treatment tank where they were washed with water by means of decantation for 5 times. By this operation a part of the sulfate radicals bonded to the hydrogels were washed away by hydrolysis and removed to the extent that the $SO_3/Al_2O_3$ on a molar basis becomes 0.63. Thereafter a 0.2% ammonia water was added in a quantity sufficient to submerge the hydrogels and heated for 2 hours at 50° C. After having once drawn off the liquid a 0.2% ammonia water was again added and treated by heating. By repeating this operation 6 times the final pH was made 8.5. Thereafter washing with water was carried out until detection of sulfate ions was no longer possible. After completion of the washing and drying in a tank thermostatically maintained at 120° C. calcination was performed for 3 hours at 600° C. whereby microspherical active alumina gel whose diameters were 0.02–0.2 mm. were obtained. Since the attrition resistance of these microspherical gels are good, they are being utilized as a very excellent fluid catalyst in organo-synthetic reactions, for example, such as the reaction for preparing acetonitrile from acetylene gas.

EXAMPLE 3

Using aluminum sulfate containing Fe and Mg as impurities ($Al_2O_3$ 8.79/100 cc., $Fe_2O_3$ 1.33, MgO 2.59, $SO_3$ 25.09, $SO_3/Al_2O_3$ mol=2.69, specific gravity 1.472) as the starting material, this was heated and concentrated. To this concentrated solution was added gradually with violent stirring powdered calcium carbonate dissolved in water, little by little in small quantities. After effecting the reaction, a basic aluminum sulfate sol ($Al_2O_3$ 9.47 g./100 cc., $Fe_2O_3$ 1.51, MgO 2.43, CaO 0.06, $SO_3$ 15.21, $$SO_3/Al_2O_3$$

(mol) 1.19, specific gravity 1.354, pH 3.75) was obtained as a supernatant liquid. This sol was allowed to stand in vacuo for 2 hours whereby the carbon dioxide gas dissolved therein was removed. Thereafter to 1 liter of this sol immediately prior to its granulation 300 cc. of water were added with stirring. The specific gravity of this liquid was 1.280. A trichlorobenzene-kerosene mixed solvent adjusted such that its specific gravity would be 1.30 at 90° C. was filled in a 5-meter granulating tower, and the temperature of the liquid was maintained at 85–90° C. by means of a heater provided to the outside of said tower. A nozzle was provided in the bottom of the tower, and in order that the nozzle would not stop up as a result of operation for a long period of hours the bottom part only was cooled to about 30° C.

The aforementioned stock solution was introduced into the solvent under pressure, and the sol whose specific gravity was lighter than the solvent ascended. In the meanwhile, the sol became spherical-shaped hydrogels having diameters of 12–20 mm., and when these hydrogels reached the uppermost part of the tower, they were retained there for 12 minutes in a heated state, following which they were immediately transferred into water. Then they were treated for an hour by adding hot water of 90° C., following which all the water was drawn off and again they were treated for an hour with hot water of 90° C. This operation was repeated 12 times. As a result, the $SO_3/Al_2O_3$ of the hydrogels on a molar basis was 0.48. Next, in order to remove the minute quantity of iron remaining, the hydrogels were immersed in a 1.3% sodium hydrosulfite and treated for 3 hours at 50° C., folowing which they were washed with water for 24 hours. Then, after immersion in a 2% ammonium sulfate solution for 15 hours, half of the solution was drawn off, a 1% ammonia water was added making the over-all concentration of ammonia water 0.3%, and this treatment was continued for 5 hours at 60° C. (the pH after treatment 4.8). Then a further addition of a 1% ammonia water was made, the over-all concentration of ammonia being made 0.6% and the treatment was performed for 5 hours at 60° C. (final pH 8.8). Next, after having drawn off all of the liquid, a 1% ammonia water was again added, and the hydrogels were treated for 5 hours at 60° C. (final pH 9.4). Then washing with water in accordance with accepted practices was performed until the detection of sulfate ions was no longer possible, following which the hydrogels were dried at 110° C., and calcined for 3 hours at 550° C. whereby were obtained spherical active alumina without cracks whose diameters were 5–9 mm. As to the chemical composition of this product, it is a practically pure γ-alumina having an ignition loss of 2.6%, specific surface area of 230 m.$^2$/gr., pressure resistance intensity of 150 kg. and heat resistance of 650° C., and it is suitable for use as a catalyst for various purposes or as a catalyst carrier.

EXAMPLE 4

Basic aluminum sulfate sol:

| | | |
|---|---|---|
| $Al_2O_3$ | g./100 cc__ | 11.16 |
| $Fe_2O_3$ | g./100 cc__ | 0.73 |
| MgO | g./100 cc__ | 1.29 |
| CaO | g./100 cc__ | 0.04 |
| $SO_3$ | g./100 cc__ | 11.97 |
| $SO_3/Al_2O_3$ mol ratio | | 0.99 |

Calculation being made however after subtracting the $SO_3$ considered to be bonded to Fe, Mg and Ca from the total $SO_3$.

pH _____ 3.69

Silica sol:

| | | |
|---|---|---|
| $SiO_2$ | g./100 cc__ | 7.80 |
| pH | | 1.60 |

The basic aluminum sulfate sol and silica sol having the above compositions were separately placed in vacuo for 2 hours, and the gases dissolved therein were removed. Then 1 liter of the basic aluminum sulfate sol and 100 cc. of the silica sol were mixed uniformly and was made the stock solution. This solution was made to pass from the bottom to the top through a trichlorobenzene-kerosene solvent heated by means of the same apparatus as in Example 3, thereby making in the meantime the sol into spherical hydrogels having diameters of 15–25 mm. After having been held at the top of the tower for 10 minutes, the hydrogels were transferred to a tank containing water which was provided at its lower part with a foraminous dish. For 24 hours lukewarm water was introduced from the top and withdrawn from the bottom, and washing with water of a part of the sulfate radicals possessed by the hydrogels was accomplished. After completion of the washing, the composition in terms of the $SO_3/Al_2O_3$ on a molar basis was 0.52 and the $SiO_2/(Al_2O_3+SiO_2)$ on a weight basis was 8.7%. Thereafter, while the water by being withdrawn from the bottom and introduced into the top was being circulated, a 5% ammonia was introduced gradually into the circulation pipe, this being carried out over a 10 hour period at a temperature of 55° C. and the quantity of ammonia used being 1.8 times the theoretical quantity required for neutralizing the residual sulfate radicals. By doing thus, the pH gradually rose from 4.0 to become finally 9.4. Next, the hydrogels were washed with water until the detection of sulfate ions was no longer possible, following which they were dried and calcined for 3 hours at 500° C., thus obtaining spherical active alumina-silica gels without cracks whose diameters were 6–10 mm. The thus obtained product will be made sample No. 2.

EXAMPLE 5

Spherical hydrogels ($SO_3/Al_2O_3$ on a molar basis—0.52. $SiO_2/(Al_2O_3+SiO_2)$ on a weight basis—8.7%) having diameters of 15–25 mm. which were prepared as in Example 4 and whose washing having been completed were placed in a tank having a foraminous dish at the bottom thereof as in Example 3, and water was circulated through the tank by withdrawing it from the top and introducing it under pressure from below the foraminous dish. The liquid was maintained at 50° C. by heating with a heater. Then a NaOH solution of 0.1% concentration was introduced from the circulation pipe until the pH became 7.0 which took 8 hours, and thereafter ammonia of 5% concentration was introduced until a pH of 9.2 was manifested which took 5 hours.

Then washing with water was performed until sulfate ions could no longer be detected, following which the hydrogels were dried and calcined for 3 hours at 500° C., thus obtaining spherical active alumina-silica gels without cracks whose diameters were 6–10 mm. and which had properties substantially the same as those of Example 3.

However, a method in which chemicals containing soda are used is in general not advantageous since it results in the adhering of traces of soda to the hydrogels as to be detrimental to their activity and durability.

EXAMPLE 6

A glass tower having a height of 650 mm. and an inside diameter of 34 mm. was filled with about 300 grams of spherical hydrogels ($SO_3/Al_2O_3$ on a molar basis—0.52, $SiO_2/(Al_2O_3+SiO_2)$ on a weight basis—8.70%) having diameters of 15–25 mm. which were prepared as in Example 4 and whose washing with water had been completed. While maintaining the temperature at 50–60° C. by warming this tower from the outside by means of Nichrome wires, 40 liters of 0.1 mol solution of ammonium acetate was pipetted from the top over a period of 8 days. The pH at the exit of the tower which at first was 4.8 finally became 7.15. When after further washing with water the hydrogels were analyzed, the sulfate radicals had been completely removed, and the $SiO_2/(Al_2O_3+SiO_2)$ was on a weight basis 7.04%. These hydrogels were dried at 110° C. and also calcined at 550° C. As a result, hard spherical active alumina-silica gels without cracks, which had a specific surface area of 330 m.$^2$/g., pressure resistance intensity of 85 kg. and heat resistance of 650° C. were obtained, which exhibited very excellent properties as industrial desiccating agents.

However, this method which does not use ammonia water at all is not advantageous for industrial use in view of the excessively long number of hours required for the complete removal of the sulfate radicals.

EXAMPLE 7

Basic aluminum sulfate sol: Silica sol:

| | | |
|---|---|---|
| $Al_2O_3$ | g./100 cc__ | 10.60 |
| $Fe_2O_3$ | g./100 cc__ | 1.38 |
| MgO | g./100 cc__ | 3.34 |
| CaO | g./100 cc__ | 0.09 |
| $SO_3$ | g./100 cc__ | 17.21 |
| $SO_3/Al_2O_3$ | mol ratio__ | 0.95 |

Calculation being made however after subtracting the $SO_3$ considered to be bonded to Fe, Mg and Ca from the total $SO_3$.

pH _____ 3.45

Silica sol:

| | | |
|---|---|---|
| $SiO_2$ | | 85 g./100 cc. |
| pH | | 1.32/20° C. |

The basic aluminum sulfate sol and silica sol having the above compositions were separately maintained in vacuo for 2 hours thereby removing the gases dissolved therein. Then the two were mixed in the proportions of 90 cc./min. of basic aluminum sol to 60 cc./min. of silica sol and immediately introduced into the granulating tower.

The granulating tower, which was 2 meters in height, was filled with a mixed solvent of di-chlorobenzene and spindle oil (s.g. 1,206/20° C.). While maintaining the solvent temperature at 85–90° C., the stock solution was pipetted from the top. The stock solution was heated and immediately formed spherical hydrogels having diameters of 8–10 mm. The hydrogels were removed from the bottom of the tower by means of a pump and transferred to a tank having a foraminous dish at its bottom where they were washed with water for 24 hours.

Thereafter, after once having drawn off all the water a urea solution of 5% concentration was added in a sufficient amount as to submerge the hydrogels, and while circulating the solution for 8 hours at 80–85° C. the hydrogels were heat treated. Then, after having again drawn off the liquid, ammonia water of 4% concentration was added in a sufficient amount to submerge the hydrogels, and at first it was circulated for 4 hours at room temperature followed by heat treating for 4 hours at 50° C. Next, it was washed with water until the sulfate ions could no longer be detected and dried at 150° C. whereby spherical active alumina-silica type gels without cracks whose diameters were 3–4 were obtained. The thus obtained product will be made sample No. 3.

When the properties and performances of typical samples of spherical active alumina gel and spherical active alumina-silica gel obtained by such as the hereinbefore-described methods and the ball-like active alumina, Alcoa H–151, of the Aluminum Company of America, 1501 Alcoa Building, Pittsburgh 19, Pa., the latter of which are commercially available in the United States of America, are shown, they are as in the following table.

Note that sample No. 1 was obtained by Example 1, sample No. 2 by Example 4 and sample No. 3 by Example No. 7.

*Table I*

PROPERTIES AND PERFORMANCES OF SPHERICAL ACTIVE ALUMINA GEL AND SPHERICAL ACTIVE ALUMINA-SILICA GEL

| Sample | No. 1 | No. 2 | No. 3 | Alcoa H-151 |
|---|---|---|---|---|
| Ratio of $SiO_2$ to $Al_2O_3$: | | | | |
| $SiO_2$ | 0 | 7 | 50 | 7 |
| $Al_2O_3$ | 100 | 93 | 50 | 93 |
| Specific gravity: | | | | |
| True specific gravity | 3.32 | 3.17 | 2.31 | 3.10 |
| Apparent density (g./cc.) | 1.30 | 0.91 | 0.91 | 1.58 |
| Bulk density (g./l.) | 800 | 560 | 550 | 880 |
| Porosity | 0.61 | 0.71 | 0.61 | 0.49 |
| Void | 0.35 | 0.38 | 0.40 | 0.44 |
| Specific surface area (m.$^2$/g.) | 230 | 360 | 420 | 350 |
| Pressure resistance intensity (Average value—kg.) | 120 | 100 | 65 | 32 |
| Heat resistance (Temperature at which deterioration of specific surface area starts), ° C | 650 | 650 | 550 | 500 |
| Moisture adsorption intensity (Attained dew point temperature), ° C | −90 | −75 | −70 | −70 |
| Moisture adsorption capacity (Amount of moisture adsorbed when equilibrium reached after allowed to stand at room temperature): | | | | |
| Relative humidity— | | | | |
| 5% | 3 | 6 | 5 | 4 |
| 20% | 6 | 10 | 9 | 9 |
| 50% | 9 | 18 | 21 | 16 |
| 90% | 34 | 57 | 45 | 36 |

The methods of measurements used with respect to the values indicated in the above table are as follows:

(1) Specific surface area: This is in accordance with The Aromatic Adsorption Procedure described in Aanalytical Chemistry, 20, 198 (1948).

(2) Pressure resistance intensity: This is determined by placing a dry spherical gel between two parallel iron plates and gradually applying pressure, the load at which breakage of the gel occurs being measured, and the arithmetical average of 20 such values being used.

(3) Heat resistance: 5–10 grams of samples are placed in a porcelain crucible and heated in a muffle furnace, then cooled to room temperature in a desiccator. The specific surface area (see: item 1, above) is then measured.

(4) Moisture adsorption intensity (attained dew point temperature): A glass tower having a height of 300 mm. and a diameter of 35 mm. is filled with 100 grams of sample screened as to be of 6–14 mesh size. The moist air of 80% R.H., 25° C. ±1° C. is passed through at the rate of 2–3 liters per minute. The air which has passed through the gel tower is then passed through an absorption tube filled with $P_2O_5$ so that during this passage the moisture still remaining in the air is absorbed. After passing the air for 75–90 minutes, the absorption tube is weighed, and from its increased weight the attained dew point temperature of the passed air is calculated.

(5) Moisture adsorption capacity: Gels which have been dried first for 3 hours at 200° C. are allow to stand for a sufficiently long time at room temperature in a desiccator having the prescribed relative humidity. Then they are weighed, and the ratio of the increased weight to the weight of the dry gels is calculated.

Alcoa H–151 is also a spherical product as in the case of the present invention, and its composition is believed to consist of aluminum hydroxide.

When the spherical active alumina gel and spherical active alumina-silica gel Nos. 1–3 obtained in accordance with the present invention are compared with Alcoa H–151, the following conspicuous difference can be noted.

The first characteristic is that as compared with Alcoa H–151 the products Nos. 1, 2 and 3 obtained in accordance with the method of the present invention in all cases were conspicuously high in their pressure resistance intensities.

While Alcoa H–151 contains 1% or so of $Na_2O$, in accordance with the present invention there is no need at all for using any soda. Hence, it is possible to prepare products which do not contain any soda at all. This is one of the contributing factors why the second characteristic is that when compared with Alcoa H–151 the products Nos. 1, 2 and 3 of the invention are markedly superior as to their heat resistances.

Type No. 1 is chiefly employed as a catalyst and a catalyst carrier while type No. 2 is used as a drying agent and for the removal of oil mist in high pressure gases. Type No. 3, which possesses a composition and performances intermediate to that of silica gel and active alumina gel, is used as a drying agent for special purposes.

In accordance with the present invention, it is possible to prepare readily on a commercial scale and at low cost spherical active alumina gel and spherical active alumina-silica gel in which, depending upon their use, not only the component ratio of $Al_2O_3$ to $SiO_2$ may be freely adjusted but also the sizes of the balls are optionally adjustable, and furthermore which possess the following characteristics: namely, superior adsorptive as well as catalytic power, high heat resistance and great pressure resistance intensity.

What we claim is:

1. A method of preparing spherical active alumina gel and spherical active alumina-silica gel, said gels being without cracks, which comprises passing through an inert, water-immiscible, liquid medium whose temperature is 40° to 100° C. a stock solution selected from the group consisting of an aqueous colloidal solution of basic aluminum sulfate having the composition $Al_2O_3 \cdot 1.6$–$0.8$ $SO_3$, and a mixed solution of an aqueous colloidal solution of basic aluminum sulfate having the composition $Al_2O_3 \cdot 1.6$–$0.8$ $SO_3$ and a silica sol of pH 1–3 wherein the $SiO_2/(Al_2O_3+SiO_2)$ is on a weight basis less than 55%, thereby forming said solution into homogeneous spherical hydrogels, then transferring into water said hydrogels before a softening phenomenon occurs therein, followed by washing said hydrogels with water so as to render the same spherical hydrogels whose $SO_3/Al_2O_3$ on a molar basis is 0.4–0.7, repeatedly contacting said hydrogels with an alkaline solution which is capable of gradually converting the sulfate radicals remaining in said hydrogels into the corresponding water-soluble salts, said repeated contacting being continued until a greater portion of said sulfate radicals are converted into said water-soluble salts and the amount of said alkaline solution directly contacting said hydrogels at any time being less than that requisite for said conversion of said greater part of said sulfate radicals, and thereafter contacting the hydrogels with an aqueous alkaline solution which is capable of forming a water-soluble sulfate salt upon contacting aluminum sulfate and having a pH of at least 7, thereby forming spherical hydrogels selected from the group consisting of aluminum hydroxide and hydrated alumina-silica, followed by drying and calcining the same.

2. The method as defined in claim 1 wherein the washing with water is performed with hot water.

3. The method as defined in claim 1 which is characterized in that calcination of said hydrogels is effected at a temperature ranging from 350° to 650° C. after completion of the drying operation.

4. The method as defined in claim 1 which is characterized in that said spherical hydrogels whose $SO_3/Al_2O_3$ on a molar basis is 0.4–0.7 are immersed in water, said water then being circulated and into the said circulating water pipetting an alkaline solution prior to its reaching the immersed layer of hydrogels.

5. A method according to claim 1 in which the spherical hydrogels, whose $SO_3/Al_2O_3$ on a molar basis is 0.4–0.7 as obtained after washing, are immersed in water to reduce the sulfate radical content thereof.

6. A method according to claim 1 wherein the spherical hydrogels, whose $SO_3/Al_2O_3$ on a molar basis is 0.4–0.7 as obtained after washing with water, are directly contacted with a solution selected from the group consisting of an aqueous solution of urea, an aqueous solution of hexamine, a buffer solution of ammonium acetate, a dilute ammonia water containing a large amount of ammonia salts, and a large amount of circulating water having ammonia water added dropwise thereto to convert a greater part of the sulfate radicals remaining in said spherical hydrogels to sulfate salts, thereafter contacting said hydrogels with an alkaline solution having a pH above 8 and capable of forming water-soluble sulfate salts upon contact with aluminum sulfate.

7. The method as defined in claim 1 wherein as said alkaline solution ammonia water is used.

8. The method as defined in claim 4 wherein as the alkaline solution ammonia water is used.

9. The method as defined in claim 1 which is characterized in that prior to granulating the stock aqueous colloidal solution of basic aluminum sulfate and the mixed solution of an aqueous colloidal solution of basic aluminum sulfate and silica sol said solutions are deaired in vacuo.

10. The method as defined in claim 1 wherein to the stock aqueous colloidal solution of basic aluminum sulfate and the mixed solution of an aqueous colloidal solution of basic aluminum sulfate and silica sol a small amount of water is added to facilitate the hydrogelling of said solutions.

11. The method as defined in claim 1 which is characterized in that said hydrogels prior to their drying are treated with a dilute solution of sodium hydrosulfite whereby the iron salts are completely removed.

12. The method as defined in claim 1 which is characterized in that said hydrogels are dried gradually under saturated steam.

13. The method according to claim 1 wherein said alkaline solution employed in said conversion of said sulfate radicals to said water-soluble salts contains a compound capable of decomposing upon heating without evolution of an excessive amount of gas to yield an alkaline material which forms water-soluble sulfate salts and said alkaline solution is gradually heated during said repeated contacting to effect said decomposition.

References Cited by the Examiner

UNITED STATES PATENTS

| | | | |
|---|---|---|---|
| 2,689,226 | 9/54 | Hoekstra | 252—448 XR |
| 2,938,874 | 5/60 | Rosinski | 252—448 XR |
| 2,967,833 | 1/61 | Kimberlin | 252—448 XR |

JULIUS GREENWALD, *Primary Examiner.*